(12) United States Patent
Luvogt et al.

(10) Patent No.: US 11,956,198 B2
(45) Date of Patent: Apr. 9, 2024

(54) METHOD AND SYSTEM FOR IDENTIFYING AND PRESENTING IMPORTANT MESSAGES

(71) Applicant: YAHOO ASSETS LLC, Dulles, VA (US)

(72) Inventors: Chris Luvogt, Fort Bragg, CA (US); Muni Xu, San Jose, CA (US); Rofaida Abdelaal, Sunnyvale, CA (US); Bhopal Singh, San Jose, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 17/896,047

(22) Filed: Aug. 25, 2022

(65) Prior Publication Data
US 2024/0073176 A1 Feb. 29, 2024

(51) Int. Cl.
*H04L 51/42* (2022.01)
*H04L 51/212* (2022.01)

(52) U.S. Cl.
CPC ........... *H04L 51/42* (2022.05); *H04L 51/212* (2022.05)

(58) Field of Classification Search
CPC .............................. H04L 51/42; H04L 51/212
See application file for complete search history.

(56) References Cited

U.S. PATENT DOCUMENTS

| | | | |
|---|---|---|---|
| 2016/0225025 A1* | 8/2016 | Sinha | G06Q 30/0257 |
| 2016/0226811 A1* | 8/2016 | Kerschhofer | H04L 51/226 |
| 2020/0380408 A1* | 12/2020 | Sridhar | H04L 51/18 |
| 2022/0172007 A1* | 6/2022 | Shang | G06F 18/24155 |
| 2023/0412549 A1* | 12/2023 | Lee | H04L 51/02 |

OTHER PUBLICATIONS

Ahn, Yong-Yeol (YY). (2018). Why you should use logarithmic scale when visualizing ratios [Video]. In YouTube. https://www.youtube.com/watch?v=Q9azoaH7gds (Year: 2018).*

* cited by examiner

*Primary Examiner* — Austin J Moreau
(74) *Attorney, Agent, or Firm* — James J. DeCarlo; Greenberg Traurig, LLP (57) ABSTRACT

In some aspects, the techniques described herein relate to a method including: receiving, by a computing device, a message corresponding to a user inbox and to be added to the user inbox; applying, by the computing device, prior to adding the message to the user inbox, a message classification model to content of the message to determine one or more classifications corresponding to the message; determining, by the computing device, that the message is an important message based on whether one or more of the classifications is one of a set of predetermined classifications; adding, by the computing device, metadata to the message, the added metadata indicating that the message is an important message; and transmitting, to the user inbox, by the computing device, the message and the added metadata.

20 Claims, 7 Drawing Sheets

METHOD AND SYSTEM FOR IDENTIFYING AND PRESENTING IMPORTANT MESSAGES

BACKGROUND

As the ubiquity of messaging systems continues to grow and become the the de facto delivery vehicle for targeted advertisements and user-specific communications, users are increasingly left to sort through the clutter to find, organize, and take appropriate actions on relevant or important messages. Such a burden often leads to users having fear of missing or not catching important emails, worrying about accidentally deleting important emails, or generally feeling overwhelmed. Most users simply don't have the time or capacity to organize important emails. This additional friction between the user and the messaging systems often results in lower user engagement or important messages being ignored and, often, missed altogether, wasting system and network resources. Some techniques in the art have attempted to determine which messages may be important, to little success, because such techniques ignore or generally do not take into account user preference or do not modify their identification logic based on user feedback.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The disclosure solves these and other problems in the art of computerized messaging systems by providing a system and method for identifying important messages and presenting such messages to a user through a message display interface (MDI). In the embodiments, important messages can include but are not limited to messages that require action (e.g., bills, credit card statements, rent payments); messages from important people (e.g., family, recruiters, schools, doctors); commercial emails (e.g., buyers, renters, deals, shipments); and notifications (e.g., new movies, social media).

In the embodiments, a messaging service analyzes messages to automatically classify a message into one or more classifications (or categories or labels, used interchangeably herein). In some embodiments, analyzing the message can include analyzing message content. As used herein, message content can include message metadata. In some embodiments, analyzing the message can include propagating the message content through a multi-label machine learning (ML) classification model and labeling or otherwise assigning to the message the categories that meet a predetermined threshold. Based on the assigned classifications, in some embodiments, the messaging service can identify important messages by determining whether one or more of the assigned classifications is one of a set of predetermined classifications. In some embodiments, the assigned classification can be added to the message as message metadata. In some embodiments, the messaging system can assign an additional label indicating whether the message is important or unimportant. In some embodiments, the additional label can be added to the message as message metadata.

In some embodiments, the set of predetermined classifications can be an arbitrary set of classifications selected by an administrator of the messaging service. In some embodiments, the set of predetermined classifications can be modified by obtaining user feedback in relation to one or more important messages. In some embodiments, the set of predetermined classifications can be modified by obtaining user feedback in relation to one or more messages not determined to be important. In some embodiments, the set of predetermined classifications can be modified by analyzing user interaction with important and unimportant messages using a ML prediction model trained on a corpus of messages including message classification and one or more actions the user has taken with respect to a given message.

In some embodiments, an MDI can be a messaging application or client on a user device that receives messages associated with an inbox of a user from a messaging service and presents said messages in the inbox to the user. In some embodiments, important messages can be presented to the user as a subset of the inbox. In some embodiments, the important messages subset of the inbox can be presented through an "Important" view in the MDI. In some embodiments, the messaging service can obtain information related to an input from the user through the MDI related to what messages or classifications of messages correspond to important messages. In some embodiments, obtaining said information can include receiving the information from the user device.

In some embodiments, the MDI can query or otherwise request that the messaging service provide messages meeting a query criteria. In some embodiments, the query criteria can include one or more of the message classifications. In some embodiments, the query criteria can include arbitrary Boolean combinations of the classifications via Boolean operators (e.g., AND, OR, and NOT). In some embodiments, the query criteria can include whether the message is important or unimportant. In some of those embodiments, the messaging service can respond to the MDI's query by filtering all the messages corresponding to the user inbox and providing the messages that meet the query criteria.

In some aspects, the techniques described herein relate to a method including: receiving, by a computing device, a message corresponding to a user inbox and to be added to the user inbox; applying, by the computing device, prior to adding the message to the user inbox, a message classification model to content of the message to determine one or more classifications corresponding to the message; determining, by the computing device, that the message is an important message based on whether one or more of the classifications is one of a set of predetermined classifications; adding, by the computing device, metadata to the message, the added metadata indicating that the message is an important message; and transmitting, to the user inbox, by the computing device, the message and the added metadata.

In some aspects, the techniques described herein relate to a method, wherein the message classification model determines the one or more classifications based on user feedback provided in relation to other messages.

In some aspects, the techniques described herein relate to a method, wherein the set of predetermined classifications are selected from classifications corresponding to messages in a corpus of messages that have a log-squashed ratio of open counts to delete counts above a predetermined threshold.

In some aspects, the techniques described herein relate to a method, wherein the set of predetermined classifications include classifications selected by the user.

In some aspects, the techniques described herein relate to a method, wherein the computing device transmits the message and the added metadata in response to a received query, the query requesting important messages.

In some aspects, the techniques described herein relate to a method, wherein the query includes query criteria comprising at least one classification corresponding to the message. In some aspects, the techniques described herein relate to a method, wherein the query includes query criteria comprising arbitrary Boolean combinations of the classifications via Boolean operators (e.g., AND, OR, and NOT).

In some aspects, the techniques described herein relate to a method, the method including receiving, by the computing device, feedback from the user corresponding to the message and the added metadata; and modifying, by the computing device, the set of predetermined classifications based on the feedback.

Various details regarding the aforementioned embodiments are described herein.

Figure 1:
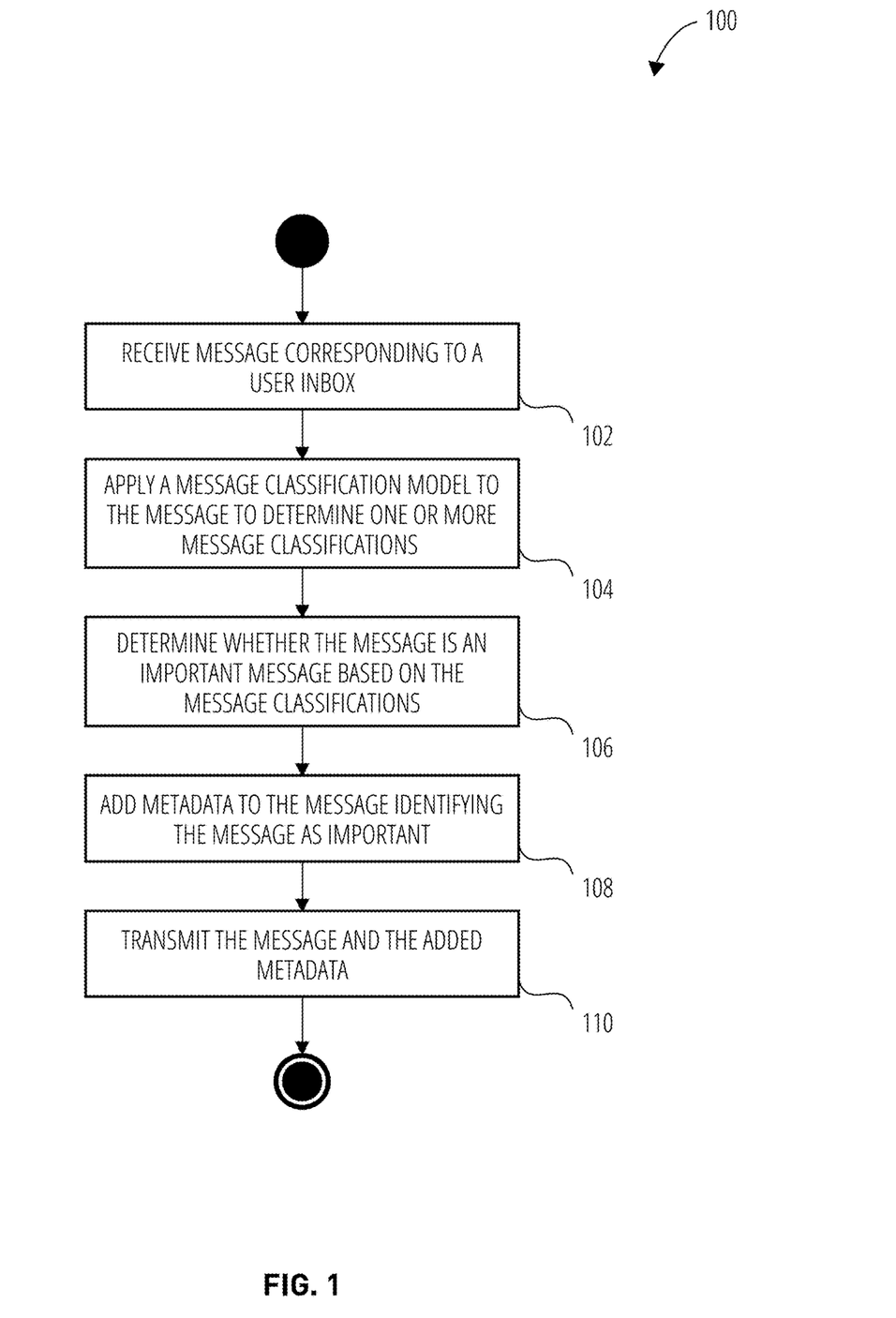
FIG. 1 is a flow diagram illustrating a method for identifying and providing important messages according to some embodiments.

FIG. 1 is a flow diagram illustrating a method for identifying and providing important messages according to some embodiments.

In Step 102, method 100 can include receiving a message associated with a user from a sender. According to some embodiments, a message can be an email, text message, in-app message, chat message, instant message, social network message or generally any other type of message. In some embodiments, the message can include message content, message data, message header data, and/or metadata. In some embodiments, a message can include text, images, or videos. In some embodiments, method 100 can receive the message as part of receiving messages generally to implement a messaging service. In some embodiments, the message can correspond to a user inbox associated with the user. In some embodiments, the message is processed (e.g., as described in Steps 104-108) prior to adding the message to the inbox. Still, in some embodiments, upon receiving the message can be added directly to the inbox and Steps 104-108 can be performed with respect to the message thereafter. In some embodiments, instead of receiving the message, method 100 can include obtaining a message that has been previously labeled as discussed hereinafter.

In Step 104, method 100 can include applying a message classification model to the message to determine one or more classifications corresponding to the message. In some embodiments, the message classification model can implement a plurality of message classification techniques to determine classifications corresponding to or descriptive of the message content and metadata. In some embodiments, the message classifications can include descriptors of the message content and/or metadata (e.g., "itinerary," "travel," "automotive," "reservation," or "confirmation"). In some embodiments, the message classification can include predicted actions a user may take with respect to the message (e.g., open, forward, delete, reply, archive). In some embodiments, the message classification model can assign one set of classifications based on classifications assigned by the user to similar messages.

According to some embodiments, a message classification model can include a multi-label predictive model that provides probabilities or likelihoods for a plurality of classes or labels (used interchangeably herein). In some embodiments, a message classification model can indicate the probability or likelihood that a given class or label describes or otherwise characterizes the message. In some embodiments, the message classification model can be any neural network or other ML or AI algorithm/architecture, known or to be known, capable of predicting a plurality of labels or classifications for a given message, without departing from the present disclosure.

In some embodiments, where the message classification model implements a ML/AI algorithm, the message classification model can be trained using a corpus of automatically or manually annotated training messages. In some embodiments, the message classification model can be trained based on historical classifications or labels assigned by the user to messages similar to the message being classified. In some embodiments, in Step 104, method 100 can determine one or more labels applicable to or descriptive of the message by propagating the message through the message classification model to generate probabilities for all the possible classes or labels that could be assigned to any given message. Then, in some embodiments, method 100 can include selecting the classes or labels that meet a probability threshold or some other predetermined threshold (e.g., top 10% of classes/labels, labels with a probability greater than 80%).

In some embodiments, the message classification model can include predicting an action (e.g., open, forward, delete, reply, archive) a user may perform with respect to the message using a ML/AI algorithm. For example, in some embodiments, the message classification model can indicate a probability that a message is going to be opened or deleted. In those embodiments, the message classification model can label the message with the probabilities corresponding to one or more actions.

In some of those embodiments, the message classification model can include extracting one or more sets of features of the message, transforming the one or more sets of extracted features into corresponding one or more sets of feature vectors, propagating the one or more sets of feature vectors through one or more fully connected layers connected to a sigmoid function activation layer to generate probabilities for the possible actions. Then, in some embodiments, method 100 can include selecting the actions that meet a probability threshold or some other predetermined threshold (e.g., top 10% of classes/labels, labels with a probability greater than 80%).

In Step 104, method 100 can include labeling the message with the classifications determined by the message classification mode using one or more of the techniques described above. In some embodiments, the message can be labeled with classifications from one or more of described techniques. For example, in some embodiments, the message can be labeled as "travel," "itinerary," and "bills." In some embodiments, labeling the message can include adding the classifications as part of the message's metadata.

In Step 106, method 100 can include determining whether the labeled message is an important message based on whether one or more of the message classifications is one of a set of predetermined classifications. In some embodiments, the set of predetermined classifications corresponds to classifications that have previously been deemed as identifying important messages or that have been selected by a user as corresponding to important messages.

In some embodiments, prior to Step 106, the messaging system can determine the set of predetermined classifications by implementing a relevant classification identification model and use the identification model to identify relevant classifications indicative of an important message from a corpus of previously labeled messages. In some embodiments, the messages in the corpus of messages include one or more classifications. In some embodiments, the messages in the corpus of messages can be automatically or manually labeled. In some embodiments, at least some of the labeled messages in the corpus of messages correspond to the user. In those embodiments, at least some of the classifications of the labeled messages corresponding to the user were assigned by the user.

In some embodiments, the relevant classification identification model can analyze the corpus of labeled messages, to determine which classifications are most relevant across the corpus or in a random subset of the corpus. In some embodiments, the relevant classification identification model can be used to analyze historical messages corresponding to a single user or a plurality of users. In some embodiments, the relevant classification identification model can be used to analyze messages without chronological constraints or messages belonging to a specific period of time (e.g., past x number of hours, days, or months).

According to some embodiments, for example, for a given classification, the relevant classification identification model can determine a total number of open counts (e.g., how many messages or how many times messages with the given classification are opened) and/or a number of delete counts (e.g., how many messages with the given classification are deleted). Then, in some embodiments, the relevant classification identification model can calculate the log-squashed ratio of open counts to delete counts to determine a quantitative level of importance. Then, in some embodiments, the classifications with a level of importance above a certain threshold (e.g., 0.5, 0.9, etc.) are determined to be associated with important messages. In some embodiments, the set of predetermined classifications includes one or more classifications with a level of importance above a certain threshold (e.g., 0.5, 0.9, etc.). In some embodiments, the level of importance can be calculated for combinations (or tuples) of classifications.

In Step 106, if a message classification, determined on Step 104, matches a classification in the set of predetermined classifications, then the message is designated as an important message.

In Step 108, method 100 can include labeling the message as important or not-important based on the result of Step 106. In some embodiments, labeling the message can include adding a new classification or label to the message's metadata indicating that the message is important. In some embodiments, where the message is a message that had been assigned classifications prior to being obtained in Step 102, in Step 108, method 100 can include further labeling the message with a classification indicating that the message is an important message as determined by a specific source.

For example, in some embodiments, prior to Step 102, a message can be manually labeled as important by the user as a result of prior operations (e.g., opening the message in a messaging application and labeling a message as important). Then, in some embodiments, the same message can be labeled as important by the messaging service as a result of Steps 102-108. In those embodiments, the message can have two labels indicating that the message is important—one by the user and one determined by the messaging service (e.g., through method 100).

In some embodiments, labeling a message with a given classification, whether assigned by the user (as discussed elsewhere herein) or assigned by the messaging service (e.g., in Step 104 or Step 108), can include indicating whether the classification was assigned by the user or automatically assigned by the messaging service. In those embodiments, the message's metadata can indicate whether a given classification is user assigned or automatically assigned.

In Step 110, method 100 can include transmitting the message. In some embodiments, prior to transmitting the message, method 100 can include adding the message to the user inbox. In some embodiments, transmitting the message includes transmitting the message and message metadata from a messaging service to a user device.

Optionally, prior to Step 110, method 100 can include receiving a query to provide messages based on query criteria. In some embodiments, the query criteria corresponds to important messages. In some embodiments, the query criteria can comprise a number of combined criterion. For example, in some embodiments, the query criteria can include a number of classifications combined through OR operations (e.g., a message with any of the identified classifications identified in the OR operation is responsive to the query), AND operations (e.g., a message must have at least all the of the identified classifications in the AND operation to be responsive to the query), NOT operations (e.g., a message that does not have the identified classification(s) is responsive to the query), and/or a combination thereof.

Table 1 illustrates, an example query in table format.

TABLE 1

| Default | Clause | User Category Name |
|---|---|---|
| Y | type = personal_correspondence OR method = human | From People |
| Y | type = bill | Bills |
| Y | type = important | Important |
| Y | action = open | Important |
| Y | open count > threshold | High Importance |
| N | type = newsletter_and_media_text | Newsletters |
| N | topic = social | Social Updates |

In some embodiments, a query can include a default set of predetermined classifications and/or user specific classifications. In some embodiments, the set of predetermined classifications is a starting point (e.g., a default) common to all users for requesting important messages from the messaging service. In some embodiments, the set of predetermined classifications can be the set of predetermined classifications described in relation to Step 106 of FIG. 1. In some embodiments, the query criteria can include one or more clauses including one or more classifications. In some embodiments, where a clause contains more than one classification, the classifications can be combined using Boolean or other mathematical operators. In some embodiments, a clause can be a default clause (e.g., common to all users or predetermined by the messaging service) or a non-default clause (e.g., specified or selected by the user). In some embodiments, a clause can have a corresponding user facing category name and the user indicates what messages are important (and thus responsive to the query) by identifying the User Categories that should be included in the query. In some embodiments, if one or more clauses apply to a message then the message is responsive to the query.

In some embodiments, a combination of classes or labels can describe a user facing category. For example, in some embodiments, the user category "Travel Plans" can include messages that are labeled with a combination of "itinerary," "travel," "automotive," "reservation," or "confirmation" (e.g., type(Travel Plans)=itinerary OR ((topic=travel OR topic=automotive) AND (type=reservation OR type=confirmation))).

Figure 2:
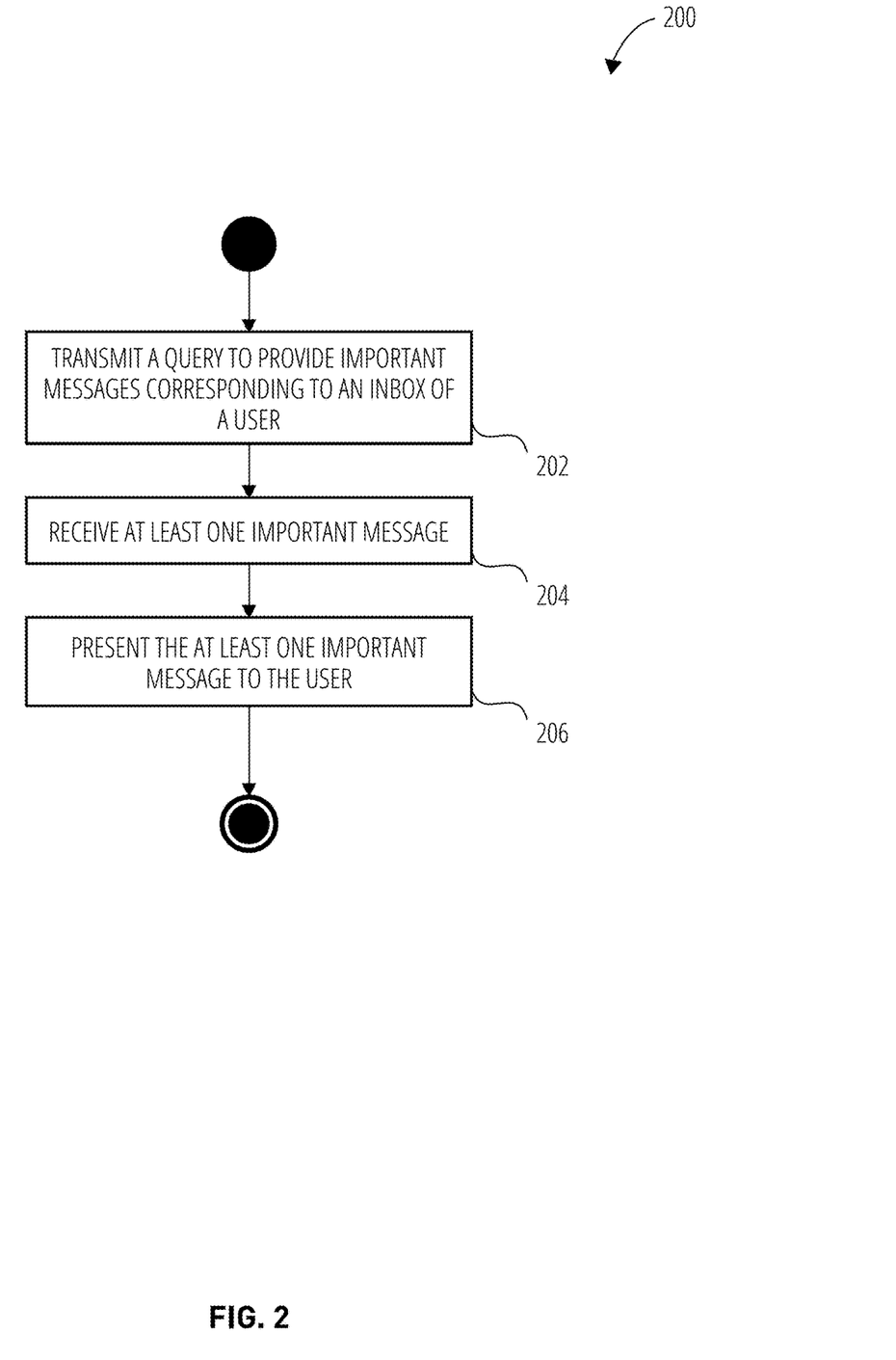
FIG. 2 is a flow diagram illustrating a method for obtaining and presenting important messages according to some embodiments.

In some embodiments, a message that has been manually labeled as important by the user and also automatically labeled as important by the messaging service (e.g., as a result of Steps 102-108) can be responsive to a query requesting important messages. In those embodiments, in Step 110, method 100 can include transmitting the message that has been labeled as important manually by the user, FIG. 2 is a flow diagram illustrating a method for obtaining and presenting important messages according to some embodiments.

In Step 202, method 200 can include transmitting a query including a request to provide important messages corresponding to an inbox of a user. In some embodiments, the query can be transmitted from a messaging application on a user device to a messaging system on a messaging server, for example. In some embodiments, the query can include query criteria as described above. In some embodiments, Step 202 is initiated upon user interaction with an MDI of a messaging application (as described in relation to FIG. 3).

In some embodiments, the query can include criteria previously determined by the messaging service and provided to the messaging application. In those embodiments, the predetermined criteria can be based on the set of predetermined classifications described in relation to Step 106 of FIG. 1. In some embodiments, the query can include criteria provided by the user. In some embodiments, the user can provide query criteria by selecting, through the MDI, categories that indicate that a message is "Important." For example, in some embodiments, the user can indicate that a message with a "High Importance" or "Social" classification is an important message. In those embodiments, query criteria can include a clause comprising "High Importance" or "Social" classifications. In some embodiments, the user can provide query criteria by providing feedback with respect to a message.

In Step 204, method 200 can include receiving at least one important message in response to the query. In some embodiments, the message can include message metadata including one or more classifications assigned by a messaging service. In some embodiments, the message can include message metadata including one or more classifications previously assigned by a user. In some embodiments, the message metadata indicates that the message is an important message. In some embodiments, messages which have been identified as important (e.g., from method 100) will be returned in response to the query.

In Step 206, method 200 can include presenting the at least one message to the user. In some embodiments, the at least one important message is presented to the user through the MDI. In some embodiments, the messaging application can be a mobile application implemented on a mobile device. In some embodiments, the MDI can be a web browser and the message is displayed through a web page.

According to some embodiments, a user can provide feedback corresponding to a classification of a message in the inbox (whether previously classified as important or not). In some embodiments, after Step 206, method 200 can include prompting the user to provide feedback corresponding to the at least one message. In some embodiments, an MDI can display a message to the user along with a prompt to select or identify a classification applicable to the message. In some embodiments, the MDI can prompt the user to indicate whether a classification of the message is appropriate or not. In some embodiments, the MDI can display the message in one part while displaying the prompt in another part. In some embodiments, the MDI can overlay the prompt over the message.

In some embodiments, the MDI can prompt the user to indicate whether the message is important or unimportant. In some embodiments, the MDI can further prompt the user to indicate whether a set of messages having a common classification are important/unimportant in response to the user indicating that a specific message of the set is important/unimportant.

To illustrate this point, in some embodiments, a package tracking message from United Parcel Service (UPS) that has been determined to be important by the messaging service (e.g., as a result of method 100) and includes the classifications "important" and "tracking" can be received by the messaging application in response to a query and displayed to the user through the MDI. (In those embodiments, the set of predetermined classifications can include the classification "tracking"). Then, in some embodiments, the MDI can prompt the user to indicate whether the message is important/unimportant. In some embodiments, upon an input from the user indicating that the package tracking message is unimportant, the MDI can further prompt the user to indicate if all package tracking messages are unimportant. In some embodiments, if the user indicates in the affirmative, the messaging application can, in addition to updating the message metadata of the package tracking message, update the message metadata of all the messages in the messaging application that have the classification "tracking" to remove the "important" classification. In some embodiments, the messaging application can transmit the updated metadata of all the messages to the messaging service or otherwise notify the messaging service that all messages with the classification "tracking" (e.g., as determined by Step 104 discussed in relation to method 100) are unimportant. In turn, in some embodiments, the messaging service can then update the set of predetermined classifications to remove the classification "tracking."

In some embodiments, where the message has been previously labeled with one or more classifications, the MDI can prompt the user to indicate whether the assigned classifications are correct or, if they are not, whether the classification should be removed. In some embodiments, based on the user's input, the messaging application can modify the message's metadata to remove or add classifications as indicated by the user. In some embodiments, modifying the message's metadata can include setting a specific flag (e.g., a value for a variable). For example, in some embodiments, if the user indicates a given message is important, the message's metadata can indicate that variable important true. As another example, in some embodiments, the user can indicate that the message falls under "Invoice" or "Travel Plans."

In some embodiments, the messaging application can transmit the message and the message's modified metadata to the messaging service to update the messaging service's records. For example, in some embodiments, where the messaging service is implemented in a server in communication with a database, the messaging service can update the database to reflect the changes to the metadata of the messages. In some embodiments, the messaging application can transmit a notification to the messaging service to indicate that the message's metadata has been changed (e.g., classifications were added or removed). In some embodiments, the messaging application can collect feedback for the classifications of a plurality of messages (e.g., batches of messages), modify the metadata of the plurality of messages as needed, and transmit the plurality of messages and associated modified metadata to the messaging service.

Then, in some embodiments, the messaging service can update the message and the message metadata on its end. In some embodiments, if the message (now with modified metadata indicating different classifications) is responsive to a new query from the messaging application to the messaging service, the messaging service can return the message in response to the query.

According to some embodiments, the messaging application can generally prompt the user (e.g., irrespective of any messages that may be displayed) at random or regular intervals to indicate which classifications to include or exclude in a query to the messaging service or which classifications indicate an important message.

Figure 3A:
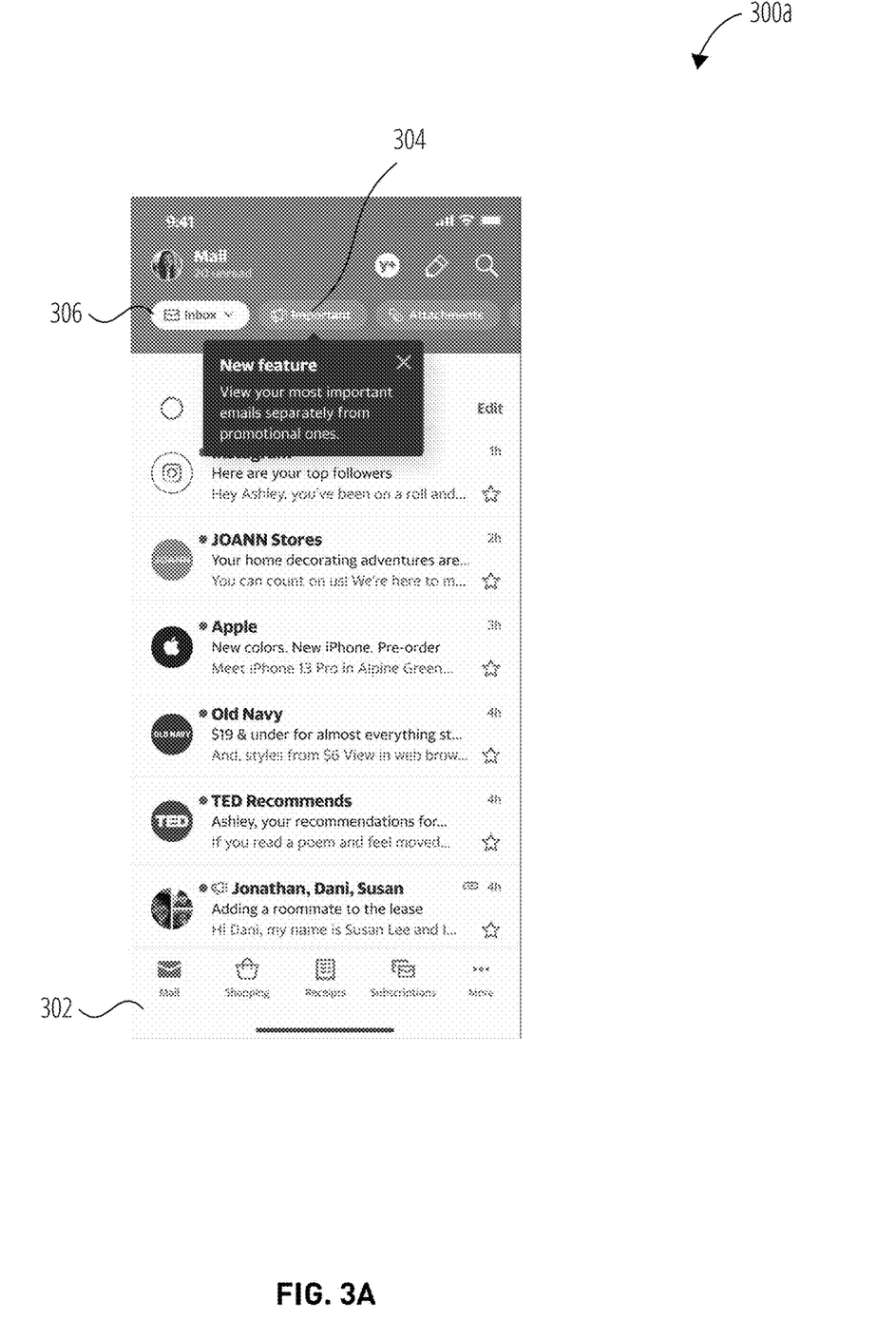
FIG. 3A illustrates a state of a user interface of a query procedure according to some embodiments.
Figure 3B:
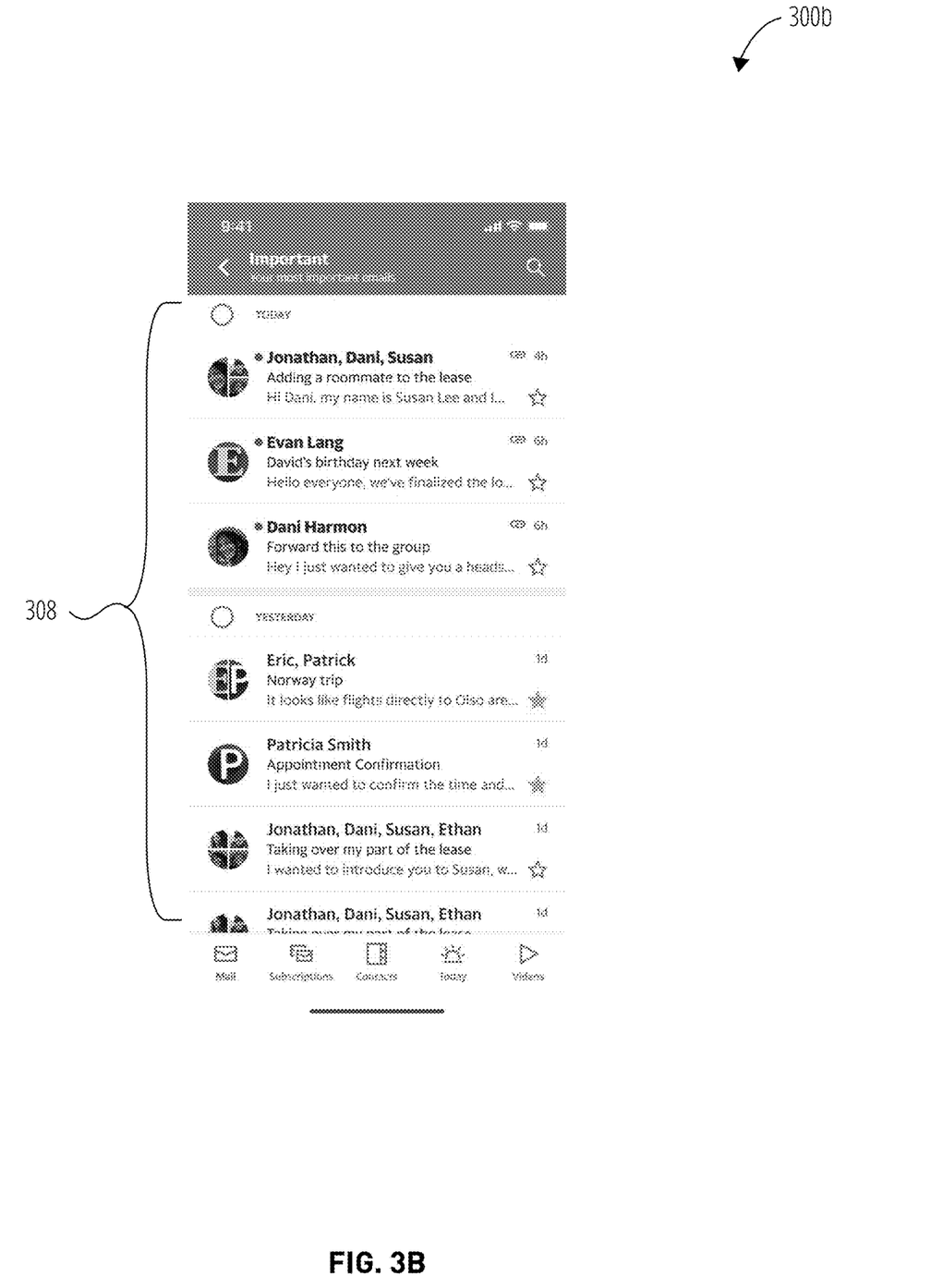
FIG. 3B illustrates another state of a user interface of a query procedure according to some embodiments.

FIGS. 3A and 3B illustrate states of a user interface of a query procedure according to some embodiments.

In a first screen 300a, a user is presented with an inbox view of a MDI of a messaging application. In the illustrated embodiment, the inbox includes general messages received from a plurality of senders including shopping or e-commerce, although the example embodiments are not limited as such. Further, the messaging application comprises an electronic mail application, although the example embodiments are not limited as such. In some embodiments, first screen 300a can be triggered by selecting an icon in the tab bar 302. For example, when the "Inbox" tab of tab bar 302 is selected, a general, importance-agnostic view of messages can be displayed (e.g., a chronological listing of email messages).

In some embodiments, when a user selects the designated tab ("Important") 304 in the menu 306 for the first time, a query procedure can be initiated. In some embodiments, the query procedure is used to request important messages as described herein. As illustrated in second screen 300b, after receiving the important messages, the messages 308 are presented to the user. In some embodiments, the user can inspect the messages and any assigned classifications and provide feedback regarding the classifications. In some embodiments, the user provides feedback corresponding to a user category related to one or more classifications.

Figure 3C:
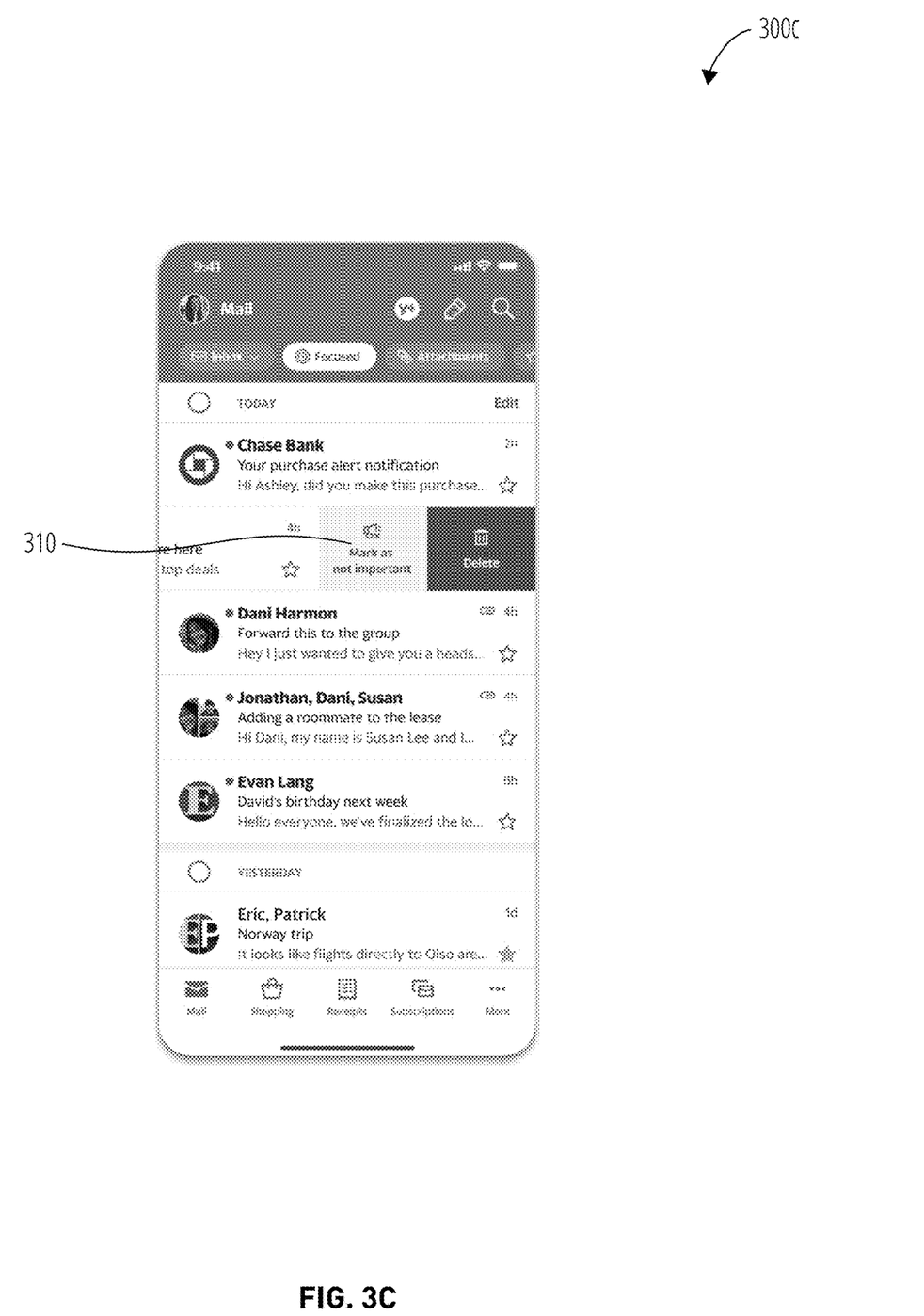
FIG. 3C illustrates a state of a user interface of a feedback procedure according to some embodiments.

FIG. 3C illustrates a state of a user interface of a feedback procedure according to some embodiments.

In the illustrated embodiments, a third screen 300c is an important message view of the messaging application. In some embodiments, the important message view can display messages that have been returned as a result of a query. In some embodiments, upon interaction by the user with a message, the message application can render third screen 300c including a button or tab 310 to indicate whether the selected message is an important message.

Figure 4:
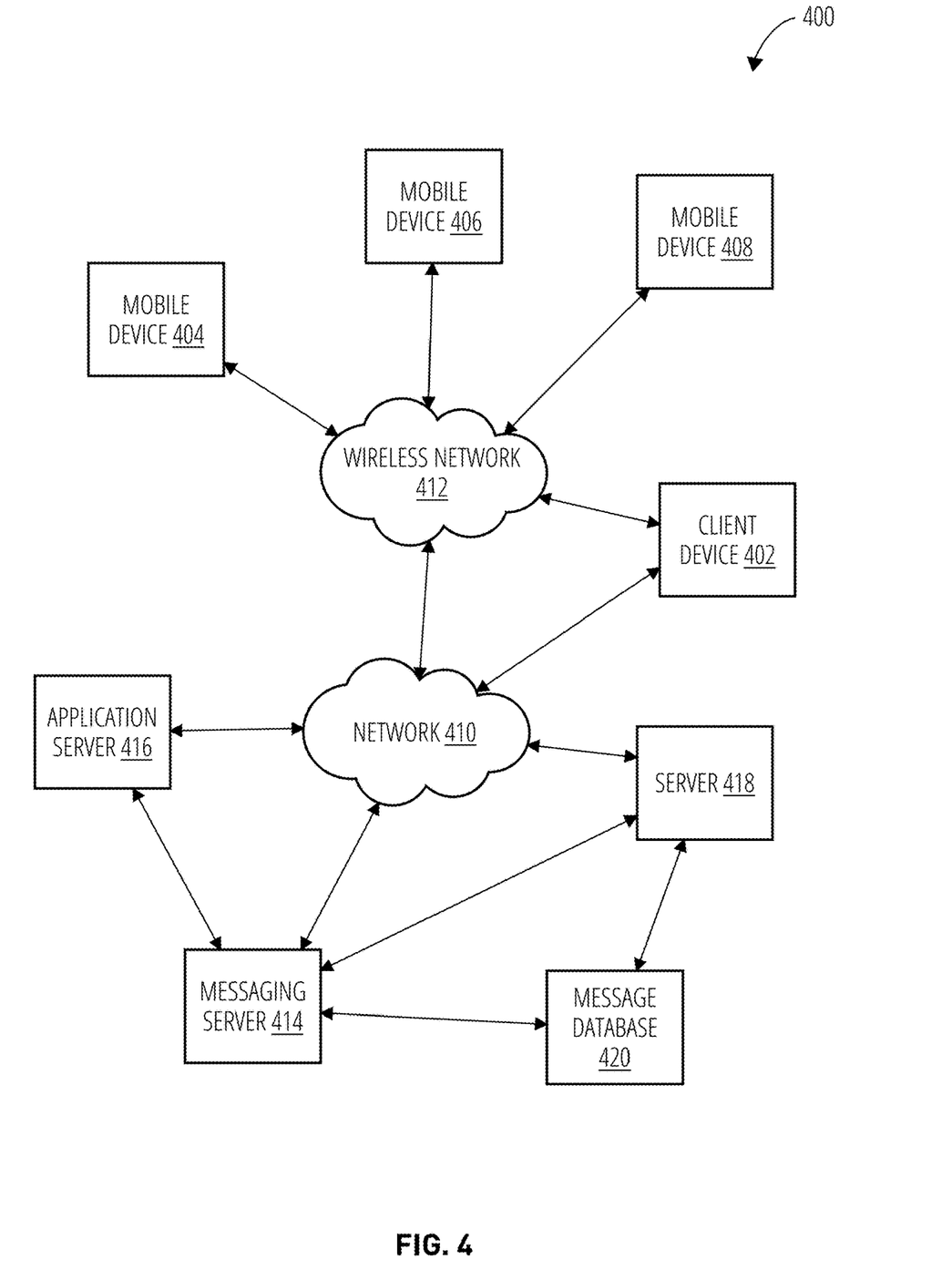
FIG. 4 is a block diagram illustrating an example environment within which the systems and methods disclosed herein could be implemented according to some embodiments.

FIG. 4 is a block diagram illustrating an example environment within which the systems and methods disclosed herein could be implemented according to some embodiments.

FIG. 4 shows components of a general environment in which the systems and methods discussed herein may be practiced. Not all the components may be required to practice the disclosure, and variations in the arrangement and type of the components may be made without departing from the spirit or scope of the disclosure.

FIG. 4 illustrates a system 400 in accordance with an embodiment of the present disclosure is shown. As shown, system 400 can include local area networks ("LANs")/wide area networks ("WANs")—network 410, wireless network 412, mobile devices (client device) 404-408 and client device 402. System 400 can also include a variety of servers, such as messaging server 414, application ("App") server 416, and third party servers 418.

One embodiment of mobile devices 404-408 is described in more detail below. Generally, however, mobile devices 404-408 can include virtually any portable computing device capable of receiving and sending a message over a network, such as network 410, wireless network 412, or the like. In some embodiments, mobile devices 404-408 can also be described generally as client devices that are configured to be portable.

Mobile devices 404-408 can also include at least one client application that is configured to receive messages from another computing device. In some embodiments, the client application can include a capability to provide and receive textual content, graphical content, audio content, and the like. In some embodiments, the client application can further provide information that identifies itself, including a type, capability, name, and the like. In one embodiment, mobile devices 404-408 may uniquely identify themselves through any of a variety of mechanisms, including a phone number, Mobile Identification Number (MIN), an electronic serial number (ESN), or other mobile device identifier.

In some embodiments, mobile devices 404-408 can also communicate with non-mobile client devices, such as client device 402, or the like. In some embodiments, client device 402 may include virtually any computing device capable of communicating over a network to send and receive information.

In some embodiments, devices 402-408 can be referred to as computing devices. Devices 402-408 may be capable of sending or receiving signals, such as via a wired or wireless network, or may be capable of processing or storing signals, such as in memory as physical memory states, and may, therefore, operate as a server. Computing devices may, for example, include portable, non-portable, and wearable devices (e.g., desktop computers, cellular phones, smart watches, and tablets).

Wireless network 412 can be configured to couple mobile devices 404-408 and its components with network 410. Wireless network 412 can include any of a variety of wireless sub-networks that may further overlay stand-alone ad-hoc networks, and the like, to provide an infrastructure-oriented connection for mobile devices 404-408. Such sub networks can include mesh networks, Wireless LAN (WLAN) networks, cellular networks, and the like. In some embodiments, a wireless network may include virtually any type of wireless communication mechanism by which signals may be communicated between computing devices.

Network 410 is configured to couple messaging server 414, App server 416, or the like, with other computing devices, including, client device 402, and through wireless network 412 to mobile devices 404-408. Network 410 is enabled to employ any form of computer readable media or network for communicating information from one electronic device to another. Also, network 410 can include the Internet in addition to local area networks (LANs), wide area networks (WANs), or direct connections. According to some embodiments, a "network" should be understood to refer to a network that may couple devices so that communications may be exchanged (e.g., between a server and a client device) including between wireless devices coupled via a wireless network, for example. A network may also include mass storage or other forms of computer or machine readable media, for example.

In some embodiments, the messaging server 414 can include a device that includes a configuration to provide any type of messaging or form of content via a network to another device. Messaging server 414 can further provide a variety of services that include, but are not limited to, email services, instant messaging (IM) services, streaming and/or downloading media services, search services, photo services, web services, social networking services, news services, third-party services, audio services, video services, mobile application services, or the like. Such services, for can be provided via the App server 416, whereby a user is able to utilize such service upon the user being authenticated, verified or identified by the service. In some embodiments, messaging server 414, App server 416, and third-party server 418 can store, obtain, retrieve, or provide interactive content and/or interactive content data as discussed herein.

Servers 414, 416, and 418 may be capable of sending or receiving signals, such as via a wired or wireless network, or may be capable of processing or storing signals, such as in memory as physical memory states. According to some embodiments, a "server" should be understood to refer to a service point which provides processing, database, and communication facilities. In some embodiments, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 414, 416, and/or 418 via the network 410 and/or wireless network 412 using their various devices 402-408.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by the App server 416, messaging server 414, and the like.

Thus, the App server 416, for example, can store various types of applications and application related information including application data and user profile information (e.g., identifying and behavioral information associated with a user). It should also be understood that messaging server 414 can also store various types of data related to the content and services provided by messaging server 414 in an associated message database 420, as discussed in more detail below.

Moreover, although FIG. 4 illustrates servers 414, 416, and 418 as single computing devices, respectively, the disclosure is not so limited. For example, one or more functions of servers 414, 416, and/or 418 can be distributed across one or more distinct computing devices. Moreover, in one embodiment, servers 414, 416, and/or 418 can be integrated into a single computing device, without departing from the scope of the present disclosure.

Figure 5:
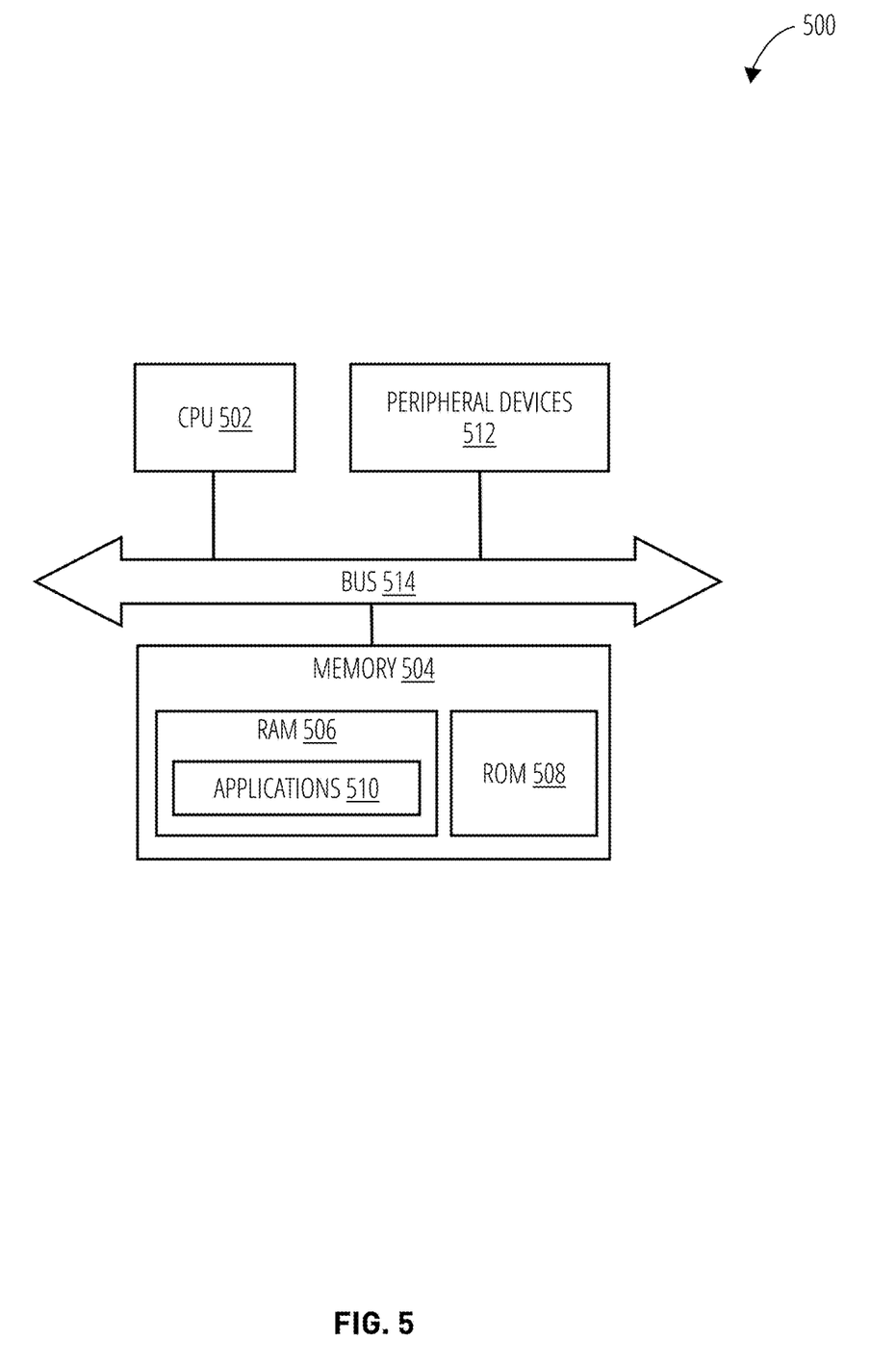
FIG. 5 is a block diagram of a device according to some embodiments.

FIG. 5 is a block diagram of a device according to some embodiments.

As illustrated, the device 500 can include a processor or central processing unit (CPU) such as CPU 502 in communication with a memory 504 via a bus 514. The device can also include one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 can comprise a general-purpose CPU. The CPU 502 can comprise a single-core or multiple-core CPU. The CPU 502 can comprise a system-on-a-chip (SoC) or a similar embedded system. In some embodiments, a graphics processing unit (GPU) can be used in place of, or in combination with, a CPU 502. Memory 504 can comprise a non-transitory memory system including a dynamic random-access memory (DRAM), static random-access memory (SRAM), Flash (e.g., NAND Flash), or combinations thereof. In one embodiment, the bus 514 can comprise a Peripheral Component Interconnect Express (PCIe) bus. In some embodiments, bus 514 can comprise multiple busses instead of a single bus.

Memory 504 illustrates an example of non-transitory computer storage media for the storage of information such as computer-readable instructions, data structures, program modules, or other data. Memory 504 can store a basic input/output system (BIOS) in read-only memory (ROM), such as ROM 508, for controlling the low-level operation of the device. The memory can also store an operating system in random-access memory (RAM) for controlling the operation of the device Applications 510 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device 500 can optionally communicate with a base station (not shown) or directly with another computing device. One or more network interfaces in peripheral devices 512 are sometimes referred to as a transceiver, transceiving device, or network interface card (NIC).

An audio interface in Peripheral devices 512 produces and receives audio signals such as the sound of a human voice. For example, an audio interface may be coupled to a speaker and microphone (not shown) to enable telecommunication with others or generate an audio acknowledgment for some action. Displays in Peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 can comprise any input device arranged to receive input from a user. An illuminator in peripheral devices 512 can provide a status indication or provide light. The device can also comprise an input/output interface in peripheral devices 512 for communication with external devices, using communication technologies, such as USB, infrared, Bluetooth™, or the like. A haptic interface in peripheral devices 512 can provide a tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a computing device, a message corresponding to a user inbox and to be added to the user inbox;
   applying, by the computing device, prior to adding the message to the user inbox, a message classification model to content of the message to determine one or more classifications corresponding to the message, the content including body text of the message and the message classification model comprising a multi-label predictive model;
   determining, by the computing device, that the message is an important message based on whether one or more of the classifications is one of a set of predetermined classifications;
   adding, by the computing device, metadata to the message, the added metadata indicating that the message is an important message; and
   transmitting, to the user inbox, by the computing device, the message and the added metadata.

2. The method of claim 1, wherein the message classification model determines the one or more classifications based on user feedback provided in relation to other messages.

3. The method of claim 1, wherein the set of predetermined classifications are selected from classifications corresponding to messages in a corpus of messages that have a log-squashed ratio of open counts to delete counts above a predetermined threshold.

4. The method of claim 1, wherein the set of predetermined classifications include classifications selected by the user.

5. The method of claim 1, wherein the computing device transmits the message and the added metadata in response to a received query, the query requesting important messages.

6. The method of claim 5, wherein the query includes query criteria comprising at least one classification corresponding to the message.

7. The method of claim 1, further comprising:
   receiving, by the computing device, feedback from the user corresponding to the message and the added metadata; and
   modifying, by the computing device, the set of predetermined classifications based on the feedback.

8. A non-transitory computer-readable storage medium, the computer-readable storage medium including instructions that when executed by a computing device, cause the computing device to:
   receive a message corresponding to a user inbox and to be added to the user inbox;
   apply, prior to adding the message to the user inbox, a message classification model to content of the message to determine one or more classifications corresponding to the message, the content including body text of the message and the message classification model comprising a multi-label predictive model;

determine that the message is an important message based on whether one or more of the classifications is one of a set of predetermined classifications;

add metadata to the message, the added metadata indicating that the message is an important message; and transmit, to the user inbox, the message and the added metadata.

9. The computer-readable storage medium of claim 8, wherein the message classification model determines the one or more classifications based on user feedback provided in relation to other messages.

10. The computer-readable storage medium of claim 8, wherein the set of predetermined classifications are selected from classifications corresponding to messages in a corpus of messages that have a log-squashed ratio of open counts to delete counts above a predetermined threshold.

11. The computer-readable storage medium of claim 8, wherein the set of predetermined classifications include classifications selected by the user.

12. The computer-readable storage medium of claim 8, wherein the computing device transmits the message and the added metadata in response to a received query, the query requesting important messages.

13. The computer-readable storage medium of claim 12, wherein the query includes query criteria comprising at least one classification corresponding to the message.

14. The computer-readable storage medium of claim 8, wherein the instructions further configure the computing device to:

receive feedback from the user corresponding to the message and the added metadata; and modify the set of predetermined classifications based on the feedback.

15. A computing device comprising:

a processor configured to:

receive a message corresponding to a user inbox and to be added to the user inbox;

apply prior to adding the message to the user inbox, a message classification model to content of the message to determine one or more classifications corresponding to the message, the content including body text of the message and the message classification model comprising a multi-label predictive model;

determine that the message is an important message based on whether one or more of the classifications is one of a set of predetermined classifications;

add metadata to the message, the added metadata indicating that the message is an important message; and transmit, to the user inbox, the message and the added metadata.

16. The computing device of claim 15, wherein the message classification model determines the one or more classifications based on user feedback provided in relation to other messages.

17. The computing device of claim 15, wherein the set of predetermined classifications are selected from classifications corresponding to messages in a corpus of messages that have a log-squashed ratio of open counts to delete counts above a predetermined threshold.

18. The computing device of claim 15, wherein the set of predetermined classifications include classifications selected by the user.

19. The computing device of claim 15, wherein the processor is further configured to transmit the message and the added metadata in response to a received query, the query requesting important messages, and wherein the query includes query criteria comprising at least one classification corresponding to the message.

20. The computing device of claim 15, wherein the processor is further configured to:

receive feedback from the user corresponding to the message and the added metadata; and modify the set of predetermined classifications based on the feedback.

\* \* \* \* \*